June 25, 1963   O. VON ZELEWSKY   3,095,247
GUIDING MEANS FOR STRAIGHT GUIDING OF PARTS, ESPECIALLY SLIDES
Filed March 2, 1961   3 Sheets-Sheet 1

INVENTOR.
Ottomar von Zelewsky
BY

United States Patent Office 3,095,247
Patented June 25, 1963

3,095,247
GUIDING MEANS FOR STRAIGHT GUIDING
OF PARTS, ESPECIALLY SLIDES
Ottomar von Zelewsky, Neuhausen am Rheinfall, Switzerland, assignor to Georg Fischer Aktiengesellschaft, Schaffhausen, Switzerland
Filed Mar. 2, 1961, Ser. No. 92,906
Claims priority, application Switzerland Mar. 5, 1960
10 Claims. (Cl. 308—3)

The present invention relates to guiding means for slides and carriages and other machine elements to be guided along a straight path. More specifically, the invention relates to a guiding arrangement of the above mentioned type, in which at least one centrally symmetric bar is over its entire length connected to a support and is embraced by at least one guiding bushing of the guided part by an angle in excess of 180°.

It is known to employ guiding bars as guiding elements for carriages and other machine parts. Furthermore, guiding arrangements with round guiding bars are known according to which guiding bushings extending around the guiding bars are equipped with slots for adjusting purposes. As adjusting elements in this connection screws extending transverse to the axis of the bushing are employed.

According to another heretofore known construction, a guiding bushing is employed which has a guiding bore eccentrically arranged with regard to its outer contour, while said guiding bushing is designed as a body of uniform resiliency. By providing pressure screws arranged transverse to the axis of the bushing, the guiding diameter may be adjusted. The plurality of the heretofore known guiding bushings are so designed that they extend around the guiding bars by at least 180° of the circumference of said bushings, preferably by at least 270°.

Due to the fact that the heretofore known guiding bushings contact the entire surface of the respective guiding bar or rod, it cannot be avoided that during the necessary post-adjustment of the bushings called for by the wear of the bushing bore, distortions of the supporting surfaces will occur so that the bushings will no longer contact the guiding bars over the entire circumference intended for supporting the guiding bars.

It is, therefore, an object of the present invention to provide a guiding arrangement of the above mentioned general character, which will overcome the above outlined drawbacks.

It is another object of this invention to provide a guiding arrangement employing a guiding bushing, which will permit a post-adjustment when necessary without the danger that a jamming or distortion will occur.

These and other objects and advantages of the invention will appear more clearly from the following specification in connection with the accompanying drawings, in which.

The guiding arrangement according to the present invention is characterized primarily in that the guiding bushing supports the guiding bar against the primarily occurring radial forces along at least three longitudinal strips which are preferably located in radial direction when looking from the center of the bar, while non-supporting strips are arranged between the said supporting strips.

Figure 1:
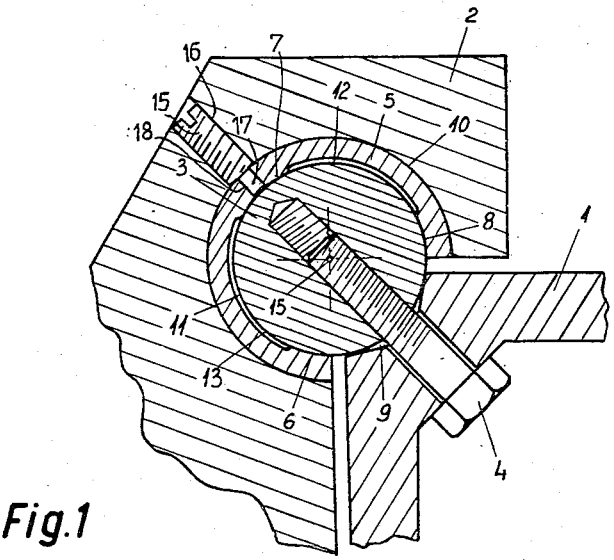
FIG. 1 illustrates a cross section through a guiding arrangement of the invention for a bar.

Referring now to the drawings and FIG. 1 thereof in detail, the arrangement shown therein comprises a round bar 3 which by means of screws 4 is held in a preferably V-shaped bar support 9 of a machine element 1 which may for instance represent a machine housing. The arrangement furthermore comprises a guiding bushing 5 the cross section of which is a part of a hollow cylinder and which surrounds the round bar by at least 270° along its circumference. The bushing 5 is held in a bore 10 of a machine part 2 to be guided, for instance a carriage. The means for holding the guiding bushing 5 in bore 10 may, for instance, consist of one or more set screws 15 arranged in a thread 16 of part 2 whereby the end 17 of the set screw 15 enters in a hole 18 provided in bushing 5 as shown in the drawings. The bore of the bushing 5 corresponds to the outer diameter 13 of the round bar 3 and is provided with two recesses 11 and 12 by means of which the supporting surface is subdivided into three longitudinal strips 6, 7 and 8 which seen from the center 5 of the round bar 3 are arranged preferably in radial direction against the primarily occurring outer forces.

Figure 2:
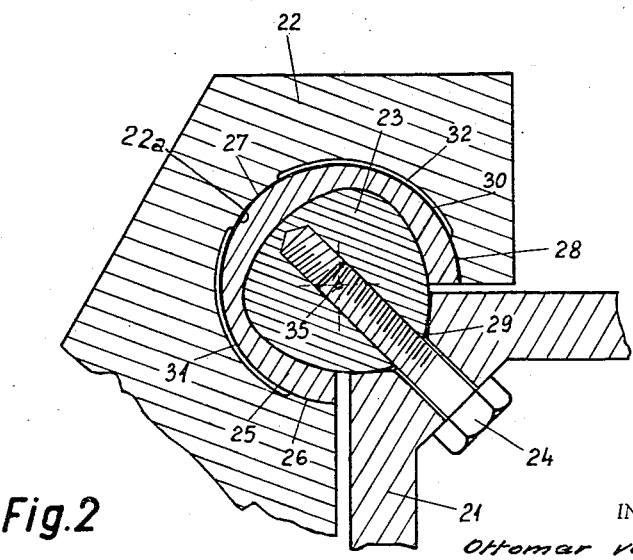
FIG. 2 is a cross section through a modified guiding arrangement of the present invention.

A further embodiment of the invention is illustrated in FIG. 2 according to which there is provided a guiding bar 23 having the cross section of a preferably three-fold symmetric equal diameter solid, which by means of screws 24 is fixedly arranged in a suitable bar supporting groove 29 of a machine element 21. The guiding bushing 25 having a cross-sectional circular outer contour 30 has an inner profile which is preferably concentrically arranged thereto and which corresponds to the outer profile of the guiding bar 23. The machine part 22 to be guided has a bore 22a which corresponds to the outer contour 30 of bushing 25 and extends approximately around 270° of the circumference of bushing 25. The bore 22a is provided with two recesses 31 and 32 thereby providing the machine part 22 with three longitudinal strips 26, 27 and 28 engaging and supporting the outer circumference 30 of the guiding bushing 25. Preferably, the three longitudinal strips 26, 27 and 28 are when looking from the bar center 35 arranged in radial direction and directed against the primarily occurring outer forces.

Figure 3:
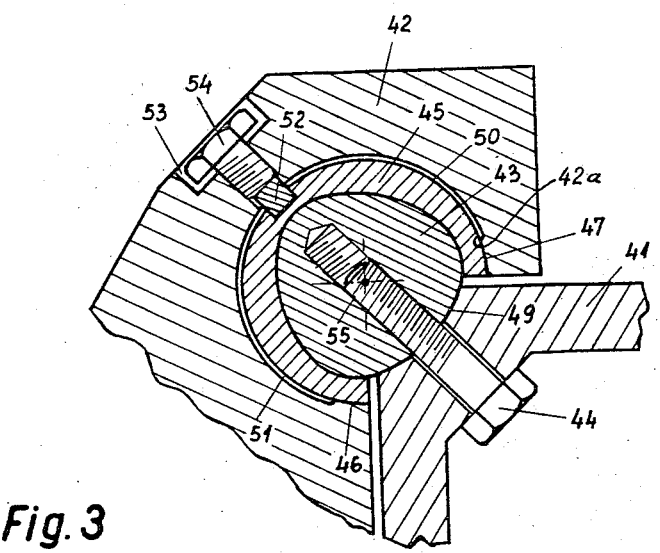
FIG. 3 is a cross section through still another guiding arrangement according to the invention with a self-locking post-adjustment element.

In the embodiment of FIG. 3 there is shown a guiding bar 43 having the cross section of a preferably three-fold symmetric equal diameter solid which is connected by means of screws 44 to a machine part 41. More specifically, the guiding bar 43 is connected to a corresponding bar supporting surface 49 which may for instance have the shape of a circular segment. The bushing 45 with circular outer contour 50 has an inner profile which corresponds to the outer profile of the guiding bar 43. The machine part 42 to be guided is provided with a bore 42a which corresponds to the outer diameter 50 of bushing 45 and extends around said bushing by at least 270° of its circumference. The said bore 42a is provided with one recess 51 extending over a major portion of its circumference. Bushing 45 rests on two longitudinal strips 46 and 47. Opposite the supporting portion 49 of the guiding bar 43, the machine part 42 has a shallow bore 53 in which is located the head of an adjusting screw 54 the bottom of which engages an intermediate member 52 guided in bushing 45. The purpose of the adjusting screw 54 consists in permitting in a self-locking manner the post-adjustment of the bushing 45 in the direction toward the central axis 55 of the bar 43.

Figure 4:
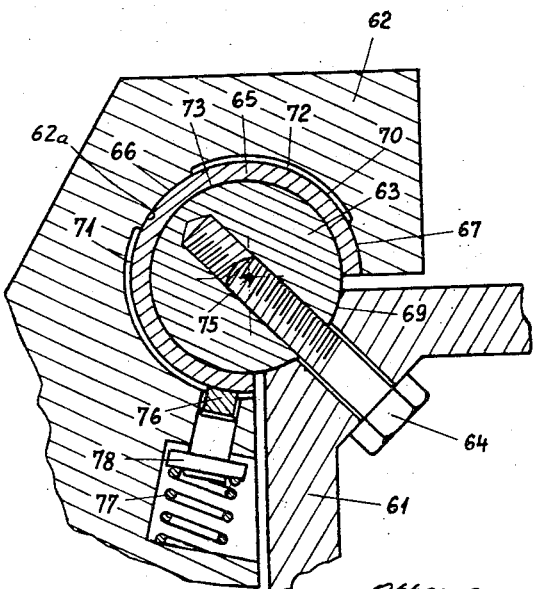
FIG. 4 represents a cross section through a guiding element with a non-self-locking post-adjustment element.

According to a further embodiment illustrated in FIG. 4, the guiding member is represented by a round bar 63 having the diameter 73. As will be seen from the drawing, round bar 63 is by means of screws 64 connected to a suitable bar support 69 of a machine part 61. The guiding bushing 65, which in cross section represents the partial cross section of a hollow cylinder, has a bore 73 which extends at least by 270° over the circumference of bar 63. The machine part 62 to be guided has a bore 62a which corresponds to the outer diameter 70 of bushing 65. The bore 62a is provided with recesses 71 and 72 whereby two longitudinal strips 66 and 67 are formed for engagement with bushing 65. In contrast to the support of bushing 5 as illustrated in FIG. 1, according to FIG. 4 one of the three fixed longitudinal strips has been replaced by a post-adjusting element. This element may consist of an intermediate member 76 arranged in the machine part 62, and of a pressure spring 77 with a pin 78 which is pressed against the outer circumference 70 of the guiding bushing 65. In this way, this part of the bushing 65 may be post-adjusted or pre-loaded in the direction toward the central axis 75 without acting in self-locking manner. However, it would also be possible to vary the thrust of spring 77 by other means in a manner well known in the art.

Figure 5:
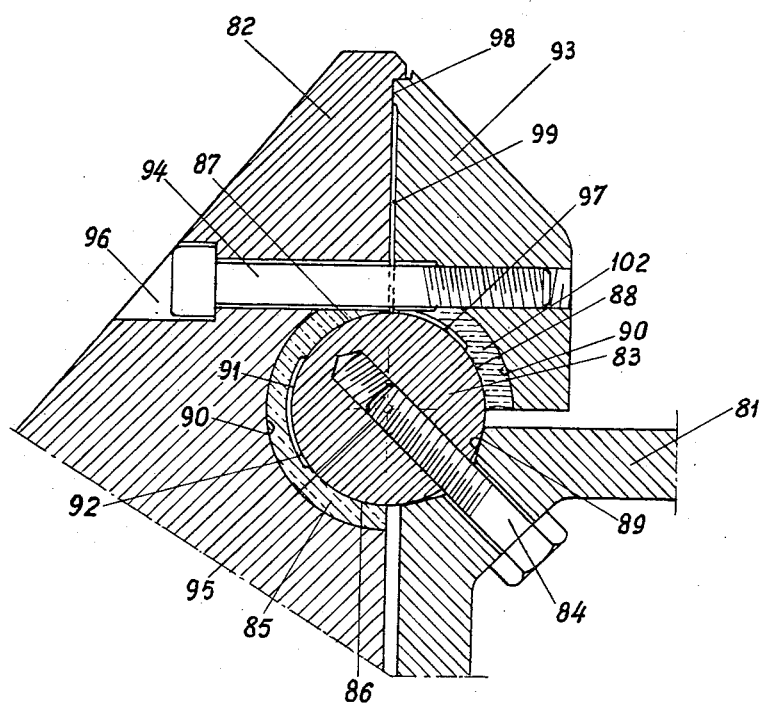
FIG. 5 is a cross section through still a further embodiment of a guiding arrangement according to the invention with self-locking post-adjusting elements.

FIG. 5 illustrates a further embodiment of the invention according to which a guiding bar 83 of circular cross section is by means of screws 84 mounted on a supporting surface 89 of a fixed machine part 81. In contradistinction to the embodiments illustrated in FIGS. 1 to 4, having a machine part to be guided which extends in one piece around the guiding member, the arrangement according to FIG. 5 comprises a split machine part 82 to be guided. This machine part 82 is provided with a portion 93 held by screws 94 mounted in depression 96. The machine part 82 to be guided and the portion 93 are provided with bores 90 having a diameter corresponding to the outer diameter of a partial guiding bushing 85 and a partial guiding bushing 102. These bushings are by any standard means (for instance as shown in FIG. 1) held in the respective machine part. Due to the provision of a recess 92 in the bore 91 of partial bushing 85 which corresponds to the outer diameter of guiding bar 83, there are created two longitudinal strips 86 and 87. Furthermore, by means of a recess 97 in bore 91 of portion 93 which last mentioned bore corresponds to the outer diameter of the guiding bar 83, there is created a longitudinal strip 88. A post-adjustment of the longitudinal strip 88 may be effected in self-locking manner by means of screws 94 which may be associated with standard means for preventing an undesired turning of screws 94. The three longitudinal strips are also with this embodiment, when seen from the central axis 95 of bar 83, located so as to act in radial direction against the primarily occurring outer forces.

The guiding arrangements according to the present invention have the advantage over heretofore known guiding arrangements of the type involved that not any longer the entire bore of the guiding bushing which rests upon the guiding bar has to be tightened or locked but only relatively narrow longitudinal strips have to be adjusted which can much faster and easier adapt themselves to the profile of the respective sliding guide and thus will result in a proper guiding arrangement. Furthermore, the subdivision of the machine part to be guided into two sections 82 and 93 will permit a proper post-adjustment because the intermediate space 99 between the said parts will permit a slight turning of the part 93 about the supporting portion 98 of part 93 on part 82.

It is, of course, to be understood that the present invention is, by no means, limited to the particular constructions shown in the drawings but also comprises any modifications within the scope of the appended claims.

What I claim is:

1. In a guiding arrangement for guiding machine elements, especially slides and carriages, along a straight path: supporting means, a guiding bar supported by and connected to said supporting means, a first member forming guiding bushing means slidably engaging and circumferentially surrounding at least 180° of the circumference of said guiding bar, and a second member forming a machine element to be guided and being connected to said bushing so the bushing moves therewith, said members being provided with at least three circumferentially spaced longitudinally extending raised strip portions therebetween forming the sole regions of engagement of said members, at least one of said strip portions being adjustable radially of said guiding bar to take up lost motion between said guide means and said guide bar.

2. A guiding arrangement according to claim 1, in which said strip portions are substantially evenly circumferentially spaced from each other and extend in radial direction with regard to the longitudinal axis of said guiding bar.

3. A guiding arrangement according to claim 1, in which said guiding bar has a circular cross section.

4. A guiding arrangement according to claim 1, in which said guiding bar has the cross section of a threefold symmetrical constant diameter solid.

5. In a guiding arrangement for guiding machine elements, especially slides and carriages, along a straight path: supporting means, a guiding bar supported by and connected to said supporting means, guiding bushing means slidably engaging and circumferentially surrounding at least 180° of the circumference of said guiding bar, and a machine element to be guided connected to said bushing means so as to move with said bushing, said machine element having at least three strip sections extending in longitudinal direction of said bushing means and upstanding toward said bushing and forming the only portions of said machine element in engagement with said bushing means, said strip sections protruding from said machine element inwardly in substantially radial direction with regard to the longitudinal axis of said guiding bar, and at least one of said strip sections being adjustable radially of said guiding bar to provide means for adjusting the bushing means to the guiding bar.

6. In a guiding arrangement for guiding machine elements, especially slides and carriages, along a straight path: supporting means, a guiding bar supported by and connected to said supporting means, a guiding bushing slidably engaging and circumferentially surrounding at least 180° of the circumference of said guiding bar, said guiding bushing being provided with at least three strip sections extending in longitudinal direction of said guiding bar and upstanding toward said guiding bar, said strip sections being the only sections of said bushing in sliding engagement with said guiding bar, and a machine element surrounding at least the major portion of said bushing on the side opposite said guiding bar and being firmly connected to said bushing, and means carried by said machine element engaging the bushing in the circumferential region of one of said strip sections operable for adjusting at least the said one strip section radially of said guiding bar.

7. In a guiding arrangement for guiding machine elements, especially slides and carriages, along a straight path: supporting means, a guiding bar supported by and connected to said supporting means, a first member forming a guiding bushing slidably engaging and circumferentially surrounding said guiding bar by at least 180°, a second member forming a machine element to be guided and being connected to said bushing, one of said members being provided with at least three strip means extending in longitudinal direction of said guiding bar and supporting said second member relative to said guiding bar along said strip means only, one of said strip means being adjustable in the direction toward and away from the longitudinal axis of said guiding bar, and adjusting means for adjusting said adjustable strip means.

8. An arrangement according to claim 7, in which said adjusting means are self-locking.

9. An arrangement according to claim 8, in which said adjusting means are yieldable in radial direction with regard to the longitudinal axis of said guiding bar.

10. In a guiding arrangement for guiding machine elements, especially slides and carriages, along a straight path: supporting means, a guiding bar supported by and connected to said supporting means, a first member composed of at least two sections forming a guiding bushing slidably engaging and circumferentially surrounding at least 180° of the circumference of said guiding bar, and a second member forming a machine element to be guided and being connected to said bushing, one of said members being provided with at least three strip means extending in longitudinal direction of said guiding bar and upstanding toward and supporting said second member relative to said guiding bar along said strip means only, at least one of said strip means being adjustable radially of said guiding bar.

References Cited in the file of this patent

UNITED STATES PATENTS

| | | |
|---|---|---|
| 1,648,441 | Brower | Nov. 8, 1927 |
| 1,673,163 | Schmelzkopf | June 12, 1928 |